PURIFICATION OF CRUDE ALKYLENE OXIDE POLYETHER

William D. Beauchamp, Robert E. Booth, and Edward R. Degginger, Syracuse, N.Y., assignors to Allied Chemical Corporation, New York, N.Y., a corporation of New York
No Drawing. Filed Sept. 28, 1959, Ser. No. 842,588
6 Claims. (Cl. 260—615)

The production of polyalkylene oxides by the addition of an alkylene oxide to an initiator and catalyzed by alkali metal hydroxides is old art as illustrated by U.S. Patents 2,425,845; 2,674,619; 2,677,700; 1,921,378 and 1,976,678. These polyethers have been employed for lubricants, dispersants, and emulsifying agents.

The production of propylene oxide polyethers (polypropylene oxide) consists of the addition of propylene oxide to propylene glycol in the presence of KOH catalyst at temperatures of 80°–160° C. The general reaction is as follows:

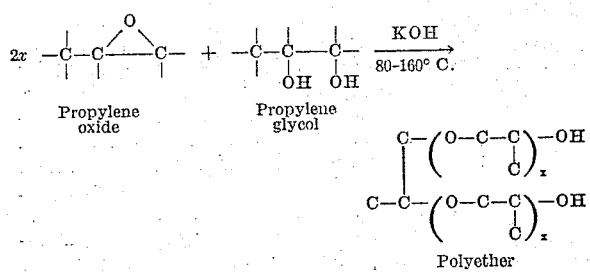

Other variations of the basic polymer can be achieved by the use of initiators such as triethanolamine, glycerol, trimethylolpropane, 1,2,6-hexanetriol and like polyols, in place of propylene glycol.

Further variation involves the addition of ethylene oxide after the basic polymer has been formed. The general reaction is as follows:

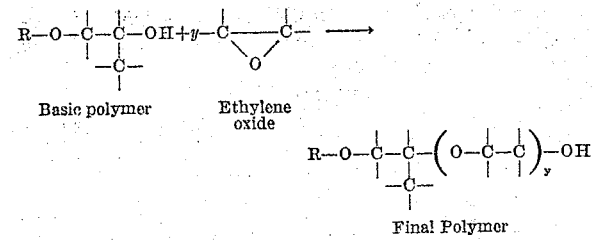

One of the new uses of considerable commercial importance to which the polyalkylene oxides, particularly polypropylene oxide and mixed polypropylene oxide and polyethylene oxide have been put is the production of polyurethanes by reaction of a polyisocyanate with a polyalkylene oxide. The requirement for a polyether product of high purity with particular reference to color, water, acidity, gel time and catalyst residue, is much more stringent for use in the production of urethane foam than had been for prior use as emulsifying agents, lubricants and the like. Typical consumer specifications for urethane foam grade propylene oxide polyether are tabulated below:

| | Specification, max. |
|---|---|
| Water, percent | 0.100 |
| Acid number (mg. KOH/g. polymer) | 0.200 |
| Na (p.p.m.) | } 10 |
| K (p.p.m.) | |
| Color (APHA) | 75 |
| [1] Gel-Test: | |
| Time (seconds) | 20.0 |
| Color (Gardner) | 3½ |

[1] Gel test procedure:
(a) A 20 gm. sample of polyether weighed into a 20 mm. x 150 mm. test tube. Add calculated amount of "Nacconate 80" * of 0.001% acidity (expressed as hydrolyzable chlorine) to give ratio NCO/OH=1.5/1.
(b) Stopper the mixture and shake vigorously for one minute.
(c) Remove stopper and heat in bath or aluminum heating block for exactly thirty minutes. Maintain the heating bath at 150° C. (±1°). Do not stir the contents of the test tube.
(d) Remove test tube from bath and cool. Allow to cool in air for ten minutes. Then stopper the tube and place in water bath at 25° C. (±0.5°) for thirty minutes.
(e) Turn the stoppered test tube upside down, hold vertical and observe time in seconds required for the bubble to reach the top of the inverted tube.
*Toluene diisocyanate, 80% 2,4-isomer and 20% 2,6-isomer.

Crude alkylene oxide polyether produced by reaction of an alkylene oxide with an initiator in the presence of an alkali metal hydroxide catalyst, usually KOH, usually contains unreacted monomer, organic by-products, moisture, colored bodies, and about 0.5% KOH as it comes from the reactor. Various ways have been suggested for refining the crude polyalkylene oxide polyether but unfortunately these methods do not produce a polyether having the rigid specifications suitable for conversion to polyurethanes unless the polyether is subjected to repeated and costly treatment with appreciable loss in yield.

An object of the present invention is to provide a method for refining crude alkylene oxide polyether to produce a high purity polyether with respect to color, water, acidity, residual catalyst and gel time and eminently suitable for conversion to polyurethane foam.

In accordance with the present invention crude alkylene oxide polyether containing residual alkali metal hydroxide catalyst is refined to high purity alkylene oxide polyether suitable for conversion to urethane foam by removing unreacted alkylene oxide monomer and other volatile constituents, preferably by passing an inert gas such as nitrogen, methane, ethane, argon, helium or other gas inert to the system, through the crude alkylene oxide polyether at a temperature of about 90–130° C. to remove unreacted alkylene oxide monomer, adding HCl and water to the crude alkylene oxide polyether, said HCl being added in an amount to reduce the pH of the crude alkylene oxide polyether to within the range of 2.2–6.0, preferably 3.5–5.5, said water being in an amount of 1.5–6, preferably 1.7–4, parts by weight water per part by weight HCl, separating precipitate, preferably by filtration, resulting from the reaction of HCl with alkali metal hydroxide in the crude alkylene oxide polyether, and removing water and acid from the alkylene oxide polyether.

Precipitation is facilitated by digesting, i.e. stirring the mixture for a few hours, 2–5 hours, to hasten the growth of the smaller particles of precipitate into larger particles which are more easily separated. The digestion may be carried out at room temperature or elevated temperatures up to about 130° C. Coagulants, although unnecessary, may be added to aid in coagulating colloidal precipitates. Filter aids such as "Filter Cel-521," "Standard Super Cel" (Johns Manville), a form of calcium carbonate, may, if desired, be added to speed up the filtration. Excess acid in the polymer may be removed by a counter-neutralizer such as calcium carbonate added after precipitation has occurred. In the practice of the present invention it was found that counter-neutralizers were ordinarily not required.

The production of alkylene oxide polyether as is conventional in the art, is accomplished by adding propylene oxide, ethylene oxide, a mixture of propylene oxide and ethylene oxide, or the sequential addition of propylene oxide and ethylene oxide to a conventional initiator containing a hydroxy group such as ethylene glycol, propylene glycol, triethanolamine, glycerol, hexanetriol, trimethylolpropane and a small amount of sodium hydroxide or preferably potassium hydroxide at a temperature of the order of about 100–140° C. to effect reaction of the alkylene oxide and growth of the chain polymer to produce a compound of the desired molecular weight, usually about 400–4000. The amount of catalyst may be varied from a fraction of one percent to several percent, but in practice approximately one-half percent KOH has been found satisfactory. Thus crude propylene oxide polyether contains about 0.5% KOH as it comes from the reactor. The art indicated that precipitation of this KOH by the addition of phosphoric acid and sulfuric acid would precipitate potassium salts and this was the method employed for the production of polyethers for lubricants, dispersants and emulsifying agents. However, these prior art methods did not produce a polyether having specifications suitable for conversion to polyurethanes which have much more rigid requirements.

The salt produced by KOH and the added acid must precipitate almost quantitatively to leave less than 10 p.p.m. potassium remaining in the product. The precipitate must be easily filtered so that a product of high clarity is produced in a reasonable time. The low acid-number specification (0.20 mg. KOH/g. polyether) for the product means that either the acid must affect complete precipitation of potassium with only a very small excess, or that excess acid must be easily removed after filtration of the precipitate. Finally, the acid must have no deleterious effect upon the polyether itself, such as dehydration of hydroxyl groups to vinyl groups, assisting oxidation, or deepening of color. The difficulty and complexity of the problem in obtaining a polyether meeting the rigid specifications for use in the production of polyurethane foam will be better understood upon a review of the intensive investigation of a number of acids, inorganic and organic under varying conditions, in an effort to obtain a suitable polyether product.

Syrupy (85%) phosphoric acid was investigated as a relatively anhydrous acid that would have no destructive effect upon the polyether molecule. Its use would obviously make the control of the acidification step much more critical: excess acid could not be removed by volatilization. Forty-four attempts were made to refine polyether with phosphoric acid, employing a wide variety of conditions and concentrations of acid.

The difficulty of phosphoric acid treatment was demonstrated by a search for a suitable acid concentration. Fifteen batches were run at a variety of $H_3PO_4$ concentrations ranging from 1.27 equivalents of acid per equivalent potassium to a 3.36 equivalent ratio (from pH 11.0 to pH 4.1, respectively, on the neutralized polymer). The results of this study showed that an $H_3PO_4$ eq./$K^+$ eq. ratio of at least 3.0 was required for complete precipitation of potassium. However, these highly acidified batches with satisfactory potassium residues were consistently high in acid number. Efforts to precipitate potassium completely with a high acid ratio and then reduce acid number by a counter-neutralization treatment, such as the addition of calcium or sodium carbonate late in the digestion period, failed to show even a trend in the desired direction.

Tartaric acid, noted as a sequestering agent, gave more promise than phosphoric acid but failed for the same reason. This dibasic acid is incapable of quantitative precipitation of potassium ion at the equivalent ratio of one (equiv. tartaric acid/equiv. $K^+$=1). Acid numbers were very high even when counter-neutralizing agents ($Na_2CO_3$ or $CaCO_3$) were added in the later stages of digestion.

Acetic acid is mentioned in U.S. Patent 2,425,845 as a neutralizing agent for KOH in the preparation of technical grade propylene oxide polyether. Three attempts to refine polyether with acetic acid showed that the acid, in any amount, is incapable of quantitative precipitation of potassium.

Other miscellaneous acids described below were examined to determine their suitability for refining polyethers of a quality to meet polyurethane specifications, but without success:

$KH_2PO_4$—could not be made to react with crude polyether even after prolonged stirring, heating, or the addition of water.

Sulfuric acid—caused severe darkening of the polyether. It left a potassium residue over 40 p.p.m. though used in a 2.33 equivalent ratio.

Carbon dioxide—prolonged efforts with digestion and added water failed to produce a filterable precipitate.

Citric acid—a tribasic acid, was used in an equivalent ratio of 3.0 and gave results comparable to the best results obtained with tartaric acid. The more detailed study of phosphoric and tartaric acids showed the unadaptability of polybasic acids to the process and made further investigation of citric acid appear fruitless.

Hydrochloric acid, together with controlled amounts of water emerged as the most efficient precipitating agent for KOH. It quantitatively precipitates KCl, leaving less than 10 p.p.m. potassium, in a form rendered easily filterable. Polyether refined with hydrochloric acid is clear, very light in color and shows no evidence of dehydration or oxidation. Moisture introduced by the aqueous acid and residual excess acid are removed from the polyether by an inert gas stripping operation using nitrogen, methane, ethane, argon, helium or other gas inert to the system.

Table I below compares specifications for polyurethane grade polyether with the average analyses of twenty-six batches of polyether that had been refined with hydrochloric acid containing controlled amounts of water in accordance with the present invention.

TABLE I

*Specification analyses of propylene glycol initiated propylene oxide polyether refined with hydrochloric acid in the presence of water*

| | Specifications | 26 Samples of Polyether |
|---|---|---|
| Water (percent) | 0.100 max | 0.036 |
| Acid Number (mg. KOH/g. polymer) | 0.200 max | 0.072 |
| Na (p.p.m.) | } 10 max | { 1.5 |
| K (p.p.m.) | | 4.1 |
| Color (APHA) | 75 max | 30 |
| Gel-Test: | | |
| Time (seconds) | 20.0 max | 14.1 |
| Color (Gardner) | 3½ max | 2½ |

In the course of our investigation with hydrochloric acid as a refining agent, we failed in numerous tests to produce a polyether product meeting polyurethane specifications. From further experimentation we found that one of the factors critical to the operation for the obtainment of a satisfactory product was control of the pH. If the pH was too high there was incomplete precipitation of K ion, giving high potassium content in the finished polyether and frequently high gel-test time. Incomplete precipitation can also render filtration very slow, or impossible, as evidenced by high turbidity in the product. A low pH is equally troublesome, apparently peptizing the precipitate instead of coagulating it, again leading to high turbidity in the product. A low pH has also been found responsible for deeper, over-specification color in the polyether. Measurement of pH is determined by the following procedure. A test solution consisting of 50 ml. water and 25 ml. acetone was adjusted to pH 7.0 by one-drop additions of 0.01 N acid or base. Crude polyether (10.0 ml.) is then added and the pH measured, using a Beckman meter.

It is important in the present process to reduce the pH to within the range of 2.2–6.0, preferably 3.5–5.5, or else the previously described problems of turbidity and high color will occur, with the production of an unsuitable product. The volatility of HCl offers a remedy in the event of accidental over-acidification of polyether. Stripping with nitrogen, either in a flask at room temperature or in a bubble-cap column at 100° C., strips off excess HCl and raises the pH to the desired range. The presence of water is another important factor in the process to obtain effective precipitation of the K ion when neutralizing with HCl. On its face, the addition of water to the crude polyether would appear disadvantageous since the refined product must be substantially free of water and such addition of water requires a subsequent step for removal of water. HCl gas in the absence of water was employed to treat crude polyether but it was found that such polyethers treated with HCl gas proved to be unfilterable regardless of the addition of coagulating aids and special digestion efforts. Other tests showed that the HCl treated crude polyether became easily filterable only after sufficient water was added. Of course, the water may be added in the form of an aqueous HCl solution or HCl gas may be passed into the crude polyether and the desired amount of water then added. Further, the amount of water should be within the range of 1.5–6, preferably 1.7–4, parts by weight water per part by weight HCl. Too little or too much water complicates the operation and makes filtering of the precipitate difficult, if not impossible.

After treatment of the crude polyether crystalline materials appear almost immediately in a colloidal form and given time these colloids digest, the larger particles growing larger at the expense of the smaller particles, the smaller ones eventually disappearing completely. This digestion process may be speeded by heat or agitation or both. In practice, it was found that stirring the mixture at room temperature or an elevated temperature up to 130° C. resulted in the building up of large, easily filtered crystals in a period of a few hours (approximately 2–4 hours). Also, it was found unnecessary prior to filtration to cool the mixture and good separation by filtration could be accomplished at temperatures from about room temperature to 130° C.

In an alternative method of separating precipitate resulting from the reaction of HCl with alkali metal hydroxide in the crude propylene oxide polyether, the crude propylene oxide polyether is diluted with an inert solvent miscible with the polyether but immiscible with water, preferably boiling within the range between about 50° and 100° C. The preferred solvent is an aliphatic hydrocarbon such as hexane and heptane or mixture of volatile hydrocarbons with solvent mixed in the proportion of about ½–3 volumes solvent to 1 volume alkylene oxide polyether. The acidified crude solvent mixture is digested for a short period of about ½ to 1 hour and the solution filtered. Filtration, unassisted by pressure or vacuum or filter aids was found to be very rapid. The solvent is evaporated off at 100–110° C., with or without reduced pressure, and the final removal of volatiles is accomplished by stripping at 100–110° C. with an inert gas such as nitrogen.

The last operation in the HCl acid refinement process of the present process is the removal of moisture and volatile acid. This may be accomplished conveniently by passing nitrogen gas or other inert gas through the polyether at an elevated temperature, of the order of about 90–130° C. In practice, a nitrogen flow-rate of 12–18 cubic feet per hour per thousand g. polyether at a temperature of 100° C. was capable of removing volatile organic acids (propionic) as well as water and HCl. The polyether product from such nitrogen treatment had an acid number of about 0.1 mg. KOH/g. polyether and nil water content. Although a counter-neutralizer has been found unnecessary, if desired calcium carbonate may be added as a counter-neutralizer to remove excess acid. The presence of propionic acid in the product is believed due at least in part to unreacted propylene oxide in the crude polyether. To minimize the formation and presence of propionic acid it is desirable to remove the propylene oxide from the crude polyether as it leaves the reactor. This may be conveniently accomplished by passing nitrogen gas through the crude polyether at an elevated temperature of the order of 90–130° C. Typically, the propylene oxide content in the crude polyether is about 1–2% and this amount may be reduced to as little as 50 p.p.m. by the nitrogen treatment.

The use of decolorizing agents to improve the color of the polyether as suggested in the art is unnecessary in the present process and in fact has been found of little effect. Decolorizing charcoal was included in the digesting mixture and also the polyether was passed through such decolorizing charcoal. Such treatments had slight color-lightening effect, invariably raised the acid number, and, when added during digestion were responsible for exceedingly slow filtration. When crude polyether was treated in accordance with the present process, there was no problem of polyether color requiring special treatment and the product was very light colored, meeting the specifications. The use of adsorbent materials such as silica gels and aluminas was investigated to determine whether they might remove colloidal potassium precipitate, or moisture and excess acid. In all cases the desired effect was slight, and the gel time was greatly increased.

The following examples illustrate the present invention.

EXAMPLE I

Crude propylene oxide polyether was prepared by passing propylene oxide into a mixture of 2100 g. KOH(85%) and 9646 g. propylene glycol at 120° C. until 766 lbs. of propylene oxide had reacted. This requires about 17 hours.

The crude propylene oxide polyether contained about 2% unreacted propylene oxide and about 0.5% residual KOH. Into this crude propylene oxide polyether maintained at a temperature of 110–120° C. was passed nitrogen gas at the rate of 7 cu. ft./hr./kg. polyether for a period of 4 hours. The resultant crude propylene oxide polyether had a propylene oxide content of about 100 p.p.m.

An aqueous hydrochloric acid solution containing 37% by weight HCl and 63% by weight water was added to the crude propylene oxide polyether in increments of about 0.1% weight of the polyether. The mixture was stirred 15 minutes after each addition of acid before pH was measured by the procedure previously described. The final pH was 4.65.

The mixture of polyether, acid and water was stirred for 3 hours at room temperature and then while stirring was heated to 100° C. The hot mixture was then filtered. Through the hot, clear filtrate maintained at a temperature of about 100° C. was passed nitrogen gas at the rate of 15 cu. ft./hr./kg. polyether for 1½ hours. The resultant polyether product was a polyurethane grade quality having the following analysis:

Acid number _____ 0.028 mg. KOH/g. polyether.
Water content _____ nil.
Color _____ 10 APHA.

Gel test:
    Time _____ 20.0 seconds.
    Color _____ 2 Gardner.
Na content _____ 1.2 p.p.m.
K content _____ 5.2 p.p.m.

EXAMPLE II

Crude propylene oxide polyether was prepared in the pilot plant by passing propylene oxide into a mixture of 6.22 lbs. KOH (85%) and 28.55 lbs. propylene glycol at 120° C. for 15½ hours until 1026 lbs. of propylene oxide had reacted. The crude product contained about 2% unreacted propylene oxide and 0.5% KOH. Unreacted propylene oxide and other volatile impurities were removed by a stream of nitrogen gas passed through the polymer at 7 cu. ft./hr./kg. polymer for 4 hours at 110–120° C. Residual unreacted propylene oxide at this point was about 100 p.p.m.

A 500 g. sample of this crude propylene oxide polyether was acidified in the laboratory with 3.5 ml. 37% aq. HCl to pH 5.35. The acidified polymer was diluted with one liter of hexane, the solution stirred one hour and filtered by gravity through a fluted filter paper. Hexane was evaporated from the polymer at 100° C. under reduced pressure, and the polymer was stripped of volatile impurities by vigorous passage of nitrogen gas at 100–110° C. for one hour. The resulting polyether product has the following specifications:

Unsaturation (meq./g.) _____ 0.039.
Acid number (mg./g.) _____ 0.023.
Water content _____ nil.
K (p.p.m.) _____ 0.
Na (p.p.m.) _____ 5.0.
Gel test:
    Time (secs.) _____ 10.2.
    Color (Gardner) _____ 1.
    Color (Barrett) _____ 0.15.
Schiff aldehyde test _____ neg.
Schiff aldehyde test at pH 3 _____ pos. in 30 secs.

Although certain preferred embodiments of the invention have been disclosed for purpose of illustration, it will be evident that various changes and modifications may be made therein without departing from the scope and spirit of the invention.

We claim:

1. A process for refining crude alkylene oxide polyether containing alkali metal hydroxide catalyst to high purity alkylene oxide polyether which comprises adding HCl and water to the crude alkylene oxide polyether, said HCl being added in amount to reduce the pH of the crude alkylene polyether to 2.2–6.0, said water being in an amount of 1.5–6 parts by weight water per part by weight HCl, and separating precipitate resulting from the reaction of HCl with alkali metal hydroxide in the crude alkylene oxide polyether.

2. A process for refining crude alkylene oxide polyether containing alkali metal hydroxide catalyst to high purity alkylene oxide polyether which comprises passing nitrogen gas through the crude alkylene oxide polyether at a temperature of about 90–130° C. to remove unreacted alkylene oxide monomer, adding HCl and water to the crude alkylene oxide polyether, said HCl being added in amount to reduce the pH of the crude alkylene polyether to 3.5–5.5, said water being in an amount of 1.7–4 parts by weight water per part by weight HCl, separating precipitate resulting from the reaction of HCl with alkali metal hydroxide in the crude alkylene oxide polyether, and passing nitrogen gas through the alkylene oxide polyether at a temperature of about 90–130° C. to remove water and acid from the alkylene oxide polyether.

3. A process for refining crude alkylene oxide polyether containing alkali metal hydroxide catalyst to high purity alkylene oxide polyether which comprises adding HCl and water to the crude alkylene oxide polyether, said HCl being added in amount to reduce the pH of the crude alkylene polyether to 2.2–6.0, said water being in an amount of 1.5–6 parts by weight water per part by weight HCl, diluting the alkylene polyether with an inert solvent miscible with the alkylene polyether and immiscible with water, and separating precipitate resulting from the reaction of HCl with alkali metal hydroxide in the crude alkylene oxide polyether.

4. A process for refining crude propylene oxide polyether containing potassium hydroxide catalyst to high purity propylene oxide polyether which comprises passing nitrogen gas through the crude propylene oxide polyether at a temperature of about 90–130° C. to remove unreacted propylene oxide monomer, adding HCl and water to the crude propylene oxide polyether, said HCl being added in amount to reduce the pH of the crude propylene polyether to 3.5–5.5, said water being in an amount of 1.7–4 parts by weight water per part by weight HCl, digesting the mixture to effect growth of crystalline precipitated particles, separating precipitate by filtration resulting from the reaction of HCl with potassium hydroxide in the crude propylene oxide polyether, and passing nitrogen gas through the propylene oxide polyether at a temperature of about 90–130° C. to remove water and acid from the propylene oxide polyether.

5. A process for refining crude propylene oxide polyether containing sodium hydroxide catalyst to high purity propylene oxide polyether which comprises passing nitrogen gas through the crude propylene oxide polyether at a temperature of about 90–130° C. to remove unreacted propylene oxide monomer, adding HCl and water to the crude propylene oxide polyether, said HCl being added in amount to reduce the pH of the crude propylene polyether to 3.5–5.5, said water being in an amount of 1.7–4 parts by weight water per part by weight HCl, digesting the mixture to effect growth of crystalline precipitated particles, separating precipitate by filtration resulting from the reaction of HCl with sodium hydroxide in the crude propylene oxide polyether, and passing nitrogen gas through the propylene oxide polyether at a temperature of about 90–130° C. to remove water and acid from the propylene oxide polyether.

6. In a process for removing residual alkali metal hydroxide catalyst from crude alkylene oxide polyether, the improvement which comprises reducing the pH of the crude alkylene oxide polyether to 3.5 to 5.5 by the addition of HCl, effecting reaction of HCl with alkali metal hydroxide in the crude alkylene oxide polyether in the presence of 1.5–6 parts by weight water per part by weight HCl, and separating the reaction product of HCl with alkali metal hydroxide from the alkylene oxide polyether.

References Cited in the file of this patent

UNITED STATES PATENTS

| | | |
|---|---|---|
| 2,425,845 | Toussaint et al. | Aug. 19, 1947 |
| 2,641,614 | Britton et al. | June 9, 1953 |
| 2,828,345 | Spriggs | Mar. 25, 1958 |